United States Patent [19]

Takagi et al.

[11] Patent Number: 4,610,174
[45] Date of Patent: Sep. 9, 1986

[54] TRANSMISSION FOR A TRACTOR

[75] Inventors: Masao Takagi, Hashimoto; Mitsuo Watashi, Sakai, both of Japan

[73] Assignee: Kubota, Ltd., Osaka, Japan

[21] Appl. No.: 643,229

[22] Filed: Aug. 22, 1984

[30] Foreign Application Priority Data

Dec. 20, 1983 [JP] Japan .......................... 58-196381[U]

[51] Int. Cl.$^4$ ............................................ F16H 37/00
[52] U.S. Cl. ..................................... 74/15.2; 74/15.4; 74/15.8
[58] Field of Search ....................... 74/15.2, 15.4, 15.8, 74/15.86, 527, 530

[56] References Cited

U.S. PATENT DOCUMENTS

| | | | |
|---|---|---|---|
| 1,876,561 | 9/1932 | Brown | 74/15.2 |
| 2,465,832 | 3/1949 | Banker | 74/527 |
| 3,302,468 | 2/1967 | Wright | 74/15.8 |
| 3,763,949 | 10/1973 | Frieburger | 74/15.2 |
| 4,141,424 | 2/1979 | Murayama et al. | 74/15.4 |
| 4,292,855 | 10/1981 | Murayama | 74/15.4 |
| 4,304,141 | 12/1981 | Tone et al. | 74/15.2 |
| 4,462,273 | 7/1984 | Yoshii et al. | 74/15.86 |

FOREIGN PATENT DOCUMENTS 1068049  10/1959  Fed. Rep. of Germany ....... 74/15.2

Primary Examiner—Lawrence Staab
Assistant Examiner—Martin G. Belisario
Attorney, Agent, or Firm—Edwin E. Greigg

[57] ABSTRACT

A transmission for a tractor in which a forward-reverse change mechanism M3 is disposed between a first change speed mechanism M1 and a second change speed mechanism M2 and to the first change speed mechanism M1 a PTO countershaft 34 and a PTO shaft shaft 32 connected thereto are operatively connected. A drive shaft 47 for front wheels is operatively connected to the second change speed mechanism M2. A rotational power is transmitted to a mid-PTO shaft 39 from the PTO countershaft 34 via a gear 50 which is mounted freely and rotatably on the drive shaft 47 for the front wheels.

9 Claims, 7 Drawing Figures

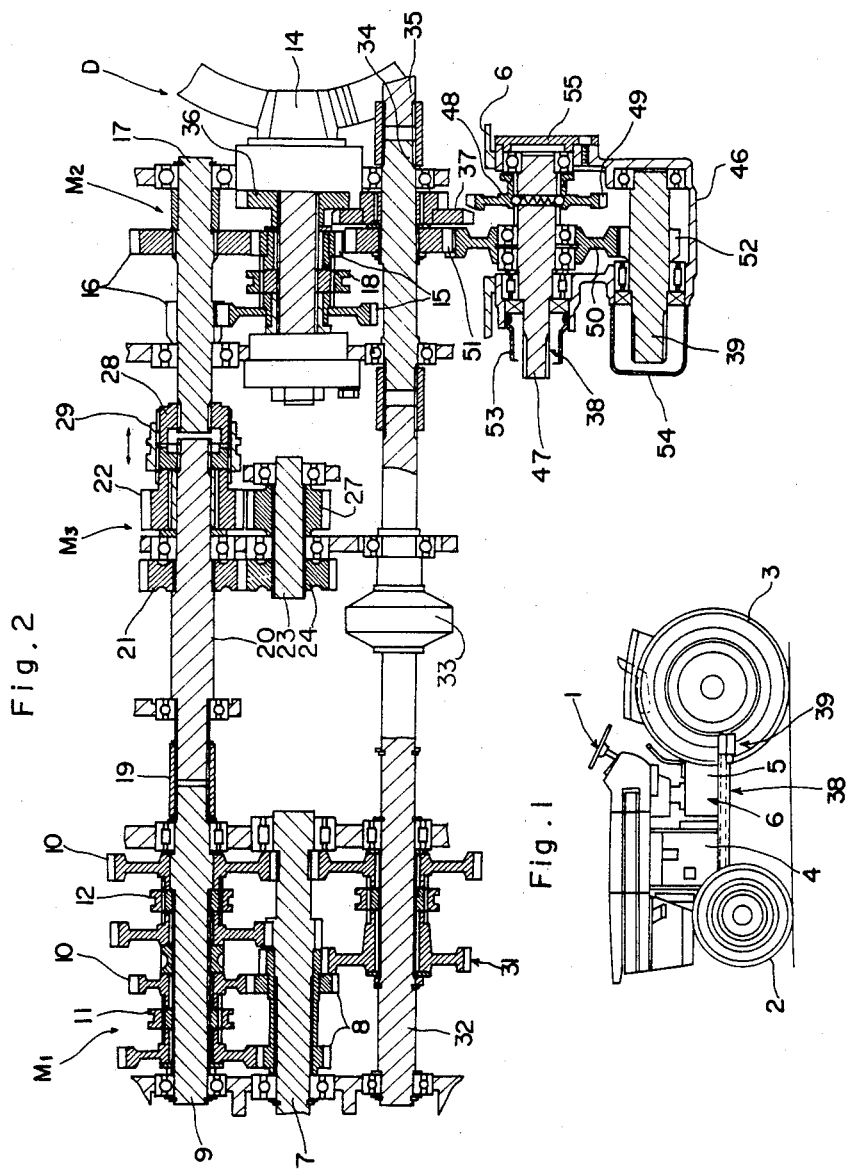

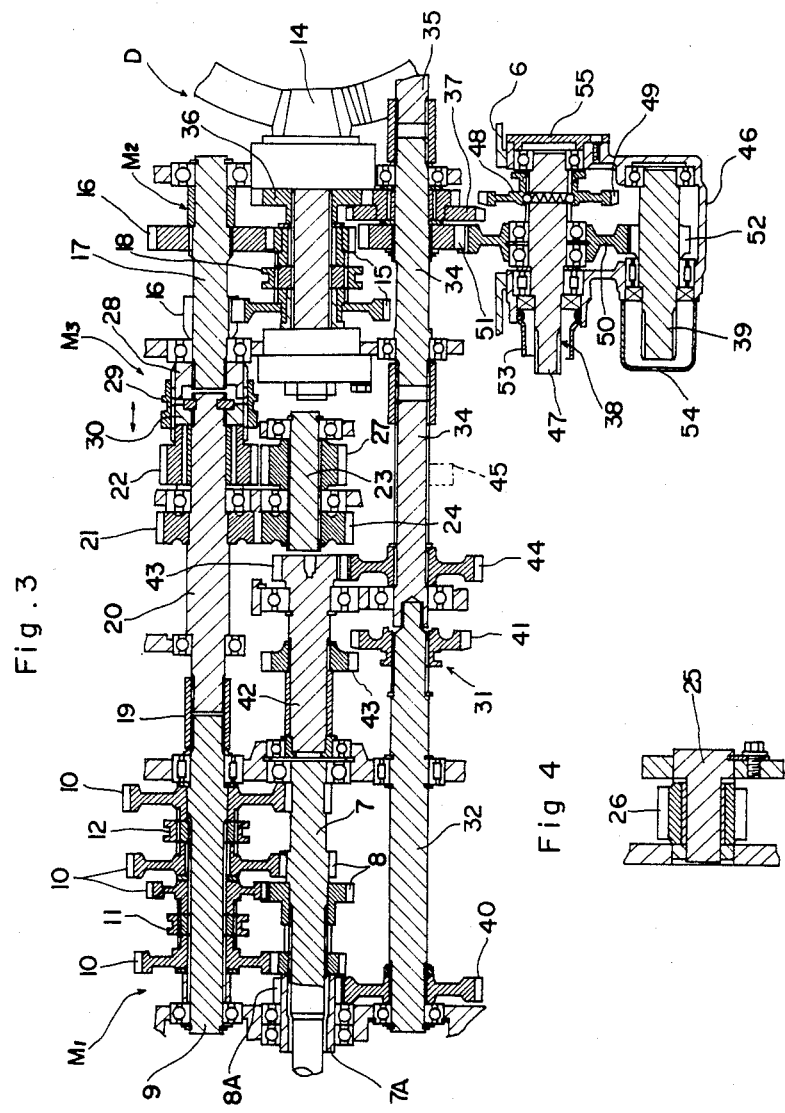

TRANSMISSION FOR A TRACTOR

BACKGROUND OF THE INVENTION

The present invention relates to a transmission for a tractor and particularly to such a transmission for a tractor which comprises a first change speed mechanism and a second change speed mechanism, each being housed respectively in a tractor body with a distance therebetween to transmit a rotation power of an engine to rear wheels, a forward-reverse change mechanism disposed between the first and second change speed mechanisms in the tractor body, and a PTO shaft connected to a PTO countershaft connected to the first change speed mechanism.

In the above-mentioned transmission for a tractor, it was conventional in the prior art that a power for driving front wheels was taken off independently of a mid-PTO power for driving working implements of mi-mount type such as a lawn mower.

Namely, a drive shaft for the front wheels was connected directly to the second change speed mechanism and a mid-PTO shaft was connected operatively and directly to a rear-PTO shaft. In other words, two power take-off mechanisms were provided independently of each other. Therefore, the prior art was complex in construction with additional parts which increases manufacturing costs.

SUMMARY OF THE INVENTION

In view of the above-mentioned drawbacks of the prior art, the present invention has an object to be able to take off a power for driving front wheels and a mid-PTO power with a simple construction by utilizing a conventional transmission.

The transmission for a tractor according to the present invention comprises a first change speed mechanism and a second change speed mechanism, each being housed respectively in a tractor body with a distance therebetween to transmit a rotational power of an engine to the rear wheels, a forward-reverse change mechanism disposed between the first and second change speed mechanisms in the tractor body, and a PTO shaft connected to a rear-PTO shaft connected to a PTO countershaft connected operatively to the first change speed mechanism, the improvement comprising a drive shaft for front wheels disposed beneath the PTO countershaft, a mid-PTO shaft disposed beneath the drive shaft for the front wheels, and a gear mounted freely on the drive shaft for the front wheels, wherein the mid-PTO shaft is operatively connected to the PTO countershaft via the gear.

Namely, by utilizing the drive shaft for the front wheels, the gear for driving the mid-PTO shaft is mounted freely rotatably on the drive shaft for the front wheels. By that means, the construction for transmission from the PTO countershaft to the mid-PTO shaft can be made simple.

Further, it is advantageous that where the gear for transmission of power from the first change speed mechanism to the drive shaft for the front wheels, is mounted freely rotatably on the PTO countershaft, the construction for the transmission may be simplified.

The other advantages of the present invention will be apparent from the following description.

BRIEF DESCRIPTION OF THE DRAWINGS

The drawings show embodiments of the present invention in which:

FIG. 1 is an overall view of a tractor,

FIG. 2 is an overall view of the first embodiment,

FIG. 3 is a sectional view partly cut away of the second embodiment,

FIG. 4 is a sectional view of a part of a forward-reverse change mechanism,

DESCRIPTION OF THE PREFERRED EMBODIMENTS

Figure 6:
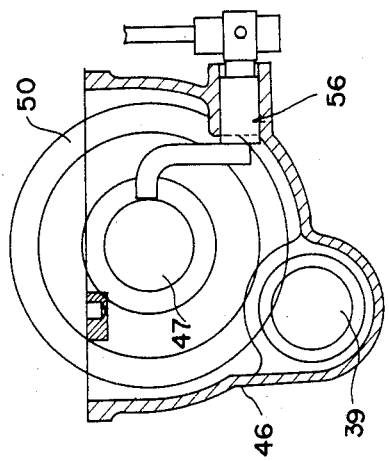
FIG. 6 is a front view of the take-off mechanism shown in FIG. 5.
Figure 7:
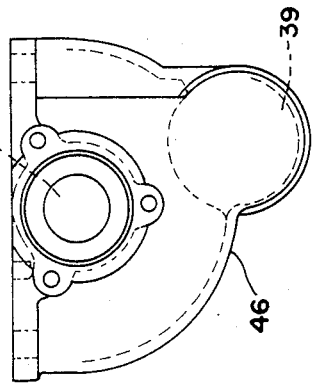
FIG. 7 is a rear view of that in FIG. 5.

FIG. 1 shows a tractor 1 of a two shaft-four wheel type, which has a pair of right and left front wheels 2 and a pair of right and left rear driven wheels 3.

An engine 4 is mounted on the front of the tractor 1 and a transmission case 5 is connected to the engine 4 via a clutch housing so as to comprise a tractor body 6 and a transmission mechanism is housed in the tractor body 6, as shown infra FIG. 2.

FIG. 2 shows the first embodiment of the present invention and a clutch for the engine 4 is a single type.

In FIG. 2, 7 is a drive shaft, and the above-mentioned clutch and a group of gears 8 are arranged in the direction of an axis of the shaft 7, leaving a predetermined distance therebetween.

Numeral 9 indicates a running change speed shaft and is disposed above and in parallel with the drive shaft 7 and a group of gears 10 of different diameters which engage with the gears 8 on the drive shaft 7, are mounted on the running change speed shaft 9 with free rotation relative to the shaft 9. In this embodiment, a change speed shift mechanism 11 of constant mesh is constructed to produce the high third and fourth speeds and the third and the fourth speeds are produced by a change speed shift mechanism 11 and 12 of constant mesh construction. However, synchromesh change speed shift mechanism may be substituted for the constant mesh change speed mechanism. Or, the constant mesh change speed shift mechanism may be used in combination with the synchromesh change speed shift mechanism.

A first change speed mechanism M1 of running drive line is constructed by a group of the gears 8 on the drive shaft 7, a further group of the gears 10, and so forth. M2 is a second change speed mechanism. The first change speed mechanism M1 is housed in the front of the tractor body 6 and the second change speed mechanism M2 is housed in the rear of the tractor body 6, so as to leave a distance therebetween.

The second change speed mechanism M2 provides a drive pinion shaft 14 which is operatively connected to a rear differential gearing D, a further group of change speed gears 15 of two step speeds which are freely and rotatably mounted on the drive shaft 14, and a change speed shaft 17 having a further group of gears 16 which engage with the change speed gears 15 respectively. The change speed shaft is mounted on the extended line of an axis of the change speed shaft 9 of the first change speed mechanism M1.

The group of change speed gears 15 in this embodiment are shiftable by means of a change speed shift mechanism 18 of constant mesh construction.

Numeral M3 is a forward-reverse change mechanism (called "shuttle change speed mechanism"), which is housed in the tractor body 6 at the middle or intermediate portion thereof between the first change speed mechanism M1 and the second change speed mechanism M2.

The forward-reverse change mechanism M3 is disposed between the change speed shaft 17 of the second change speed mechanism M2 and a countershaft 20 which is connectable with the change speed shaft 9 of the first change speed mechanism M1 via a coupling 19.

Namely, the forward-reverse change mechanism M3 is constructed as follows: A gear 21 is fixed on the countershaft 20 and a gear 22 is mounted freely and rotatably on the countershaft 20. A shuttle shaft 23, which is mounted beneath and parallel with the countershaft 20, has thereon a gear 24 engaging with the gear 21, and a gear 27 engaging with an idle gear 22 via a countergear 26 which is mounted on a shaft 25 as shown in FIG. 4. A shifter 29 is mounted on a coupling 28 which is fixed on the forward end of the change speed shaft 17, so as to be selectively engagable with the idle gear 22 or the coupling 30, shown in FIG. 3, on the countershaft 20 by sliding or shifting the shifter 29.

Numeral 31 indicates a PTO change speed mechanism which is operatively connected to the drive shaft 7 of two step speeds in this embodiment and a PTO change speed shaft 32 is operatively connected to a PTO shaft 35 via a one way-clutch 33, a PTO countershaft 34 and so forth and these PTO drive lines are housed in the lower portion of the tractor body 6.

Figure 5:
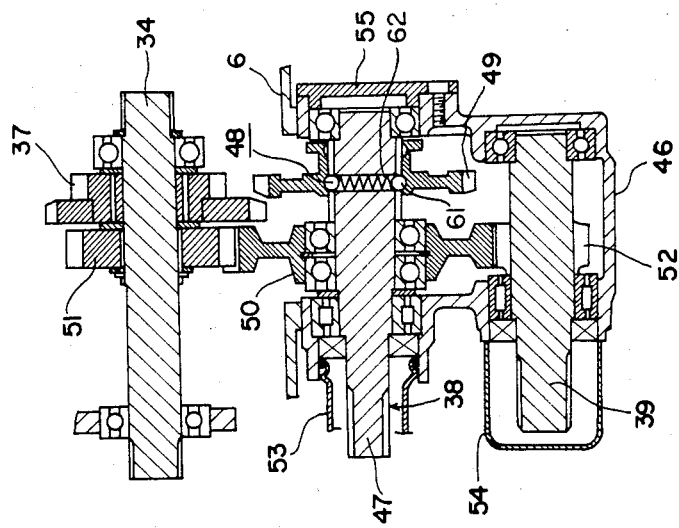
FIG. 5 is a sectional side view of a power take-off mechanism.

A drive gear 36 for the front wheels is fixed on the drive pinion shaft 14 and operatively connected to a front wheel drive device 38, which is shown in FIG. 1, via a gear 37 on the PTO countershaft 34, and this construction will be described below with reference to FIG. 5.

FIG. 3 shows the second embodiment of the present invention. Since an engine clutch is constructed as a double-clutch, the construction of PTO drive lines are different from those of the first embodiment, but the running drive lines are the same as those of the first embodiment and therefore the same parts are indicated with the same numerals and symbols.

Now, the differences will be described. A PTO drive shaft 7A of tubular construction is coaxially mounted on the drive shaft 7 and a gear 8A is fixed on the shaft 7A and then a gear 40 of the PTO change speed shaft 32 is engaged with the gear 8A.

The change speed mechanism 31 is disposed between the PTO change speed shaft 32 and the PTO countershaft 34.

Namely, the PTO change speed shaft 31 is connectable with the PTO countershaft 34 via a sliding of a shift gear 41. A change speed countershaft 42 is mounted between the drive shaft 7 and the shuttle shaft 23 and a group of gears 43 are fixed on the change speed countershaft 42. One of the gears 43 is engaged selectively with the shift gear 41 and one of the other gears 43 is engaged with a gear 44 on the PTO countershaft 34. Further, 45 in FIG. 3, indicates a weight which is fixed on the PTO countershaft 34 and functions as a flywheel so as to even or level irregular rotation of the PTO drive lines and minimize noises of gearing.

As shown in FIGS. 5 through 7, 46 indicates a power take-off casing and detachably mounted on the undersurface of the tractor body 6. In the casing 46, a drive shaft 47 for the front wheels 2 is mounted in the forward-rearward direction of the tractor body 6, and a mid-PTO shaft 39 is mounted beneath the shaft 47 offset to one side of the tractor body 6 and in the forward-rearward direction of the tractor body 6.

A shift gear 49 is splined on the drive shaft 47 to be able to slide against a position-setting mechanism 48 which comprises balls 61 and a spring 62. The shift gear 49 is selectively engagable with the idle gear 37 on the PTO countershaft 34.

A gear 50 is rotatably mounted on the drive shaft 47 via bearings and the gear 50 is engaged with a gear 51 fixed on the PTO countershaft 34 of the PTO drive lines and also engaged with a gear 52 on the mid-PTO shaft 39, so that the front wheel drive device 38 may be operatively connected to a front wheel differential gearing synchronously or harmonically and that the mid-PTO shaft 39 may be synchronized or harmonized with the rear-PTO shaft 35 as a line-PTO.

In FIGS. 5 through 7, 53 is a drive shaft cover, and 54 is a mid-PTO shaft cover which is detachable. Numeral 55 is a cover for holding a bearing and is secured to the casing 46 by means of bolts. Numeral 56 indicates a shift mechanism for the shift gear 49.

Next, function of the above-mentioned construction will be described.

The rotational power of the engine 4 is transmitted to the drive shaft 7 via a clutch, which is not shown in the drawings. The first change speed mechanism M1 in this embodiment enables one to vary the rotational power into four step speeds and the second change speed mechanism M2 varies the output from the first change speed mechanism M1 into two step speeds and then the rear wheels 3 are driven via the differential gearing D and the final reduction mechanism which is not shown in the drawings. In this case, the shifter 29 is slid to the right as indicated by an arrow in FIGS. 2 and 3 so as to engage with the coupling 30. Contrary to this, where the shifter 29 is slided to left as indicated by an arrow so as to engage with the idle gear 22, the change speed shaft 17 is then rotated reversely via the gears 21 and 24, the shuttle shaft 23 and the gears 27 and 26, so that back traveling may be obtained. Thus, the changing actions of the shifter 29 bring about back and forward movement under the same step of speed selected. The rear-PTO shaft 35 and the mid-PTO shaft are driven by the first change speed mechanism M1 via the PTO countershaft 34, and then the working implements connected respectively to these PTO shifts, are driven. The drive shaft 47 for the front wheels 2 are driven by the second change speed mechanism M2 via the drive pinion shaft 14.

Further, in the transmission for a tractor according to the present invention in which the rotational power of the engine 4 is transmitted to the wheels 3 via the first change speed mechanism M1 and the second change speed mechanism M2, the first change speed mechanism M1 and the second change speed mechanism M2 are housed in the tractor body 6 at the forward and rearward thereof by leaving a distance between these mechanisms M1 and M2 and the forward-reverse change mechanism M3 (shuttle change speed mechanism) is housed in the tractor body 6 to be located at the intermediate portion thereof. Namely, by utilizing the space between the first change speed mechanism M1 and the second change speed mechanism M2 in the intermediate portion of the tractor body 6 to position the forward-reverse change mechanism M3, this mechanism M3 may be manufactured and installed independently of the first change speed mechanism M1 and the second change speed mechanism M2. Therefore, it is easy to assemble the transmission and also to carry out maintenance thereof. Further, since a so-called dead space between the first and second change speed mechanisms M1 and M2 is used effectively, it is advantageous that the forward-reverse change mechanism M3 may be installed without widening the wheel base of the tractor 1.

We claim:

1. A transmission for a tractor having front and rear wheels comprising:
    an input shaft operatively connected to an engine;
    running-travel shaft means operatively connected between said input shaft and a rear wheel drive shaft for driving the rear wheels of said tractor, said running-travel shaft means including a main change speed means;
    PTO shaft means operatively connected to said input shaft and including a PTO counter shaft;
    a first gear rotatably mounted on said PTO counter shaft and operatively connected to said rear wheel drive shaft;
    front wheel drive shaft means disposed below said PTO counter shaft and including a second gear rotatably mounted thereon, said front wheel drive shaft means being adapted to be operatively connectable to said rear wheel drive shaft through said first gear;
    a mid-PTO shaft disposed below said front wheel drive shaft means and operatively connected to said PTO counter shaft through said second gear.

2. The transmission of claim 1 wherein
    said front wheel drive shaft means includes shift means selectively engageable with said first gear.

3. The transmission of claim 2 wherein
    said PTO counter shaft is provided with a fixed gear thereon which is in constant mesh with said second gear.

4. The transmission of claim 3 further comprising a rear PTO shaft connected to said PTO counter shaft.

5. The transmission of claim 4 wherein
    said running-travel shaft means and said PTO shaft means are operatively connected to said input shaft through said main change speed means and through a PTO change speed means, respectively.

6. The transmission of claim 5 wherein
    said running-travel shaft means is operatively connected to said rear wheel drive shaft through second change speed means.

7. The transmission of claim 6 wherein
    said running-travel shaft means includes forward-reverse switching means, said switching means being disposed between said main and second change speed means.

8. A transmission for a tractor including front and rear wheels comprising:
    a running-travel transmission line means including change speed means and a rear wheel drive shaft for driving the rear wheels of said tractor;
    PTO transmission line means including PTO shaft means for transferring the power from an engine;
    said running-travel and PTO transmission line means being mutually exclusive;
    a first gear rotatably mounted on said PTO shaft means and operatively connected to said rear wheel drive shaft;
    front wheel drive shaft means disposed below said PTO shaft means and including a second gear rotatably mounted thereon, said front wheel drive shaft means being operatively connectable to said rear wheel drive shaft through said first gear;
    mid-PTO shaft means disposed below said front wheel drive shaft means, said mid-PTO shaft means being operatively connected to said PTO shaft means through said second gear.

9. The transmission of claim 8 wherein said running-travel transmission line means includes forward-reverse switching means arranged rearwardly of said change speed means and second change speed means arranged rearwardly of said switching means.

* * * * *